Figure 1:
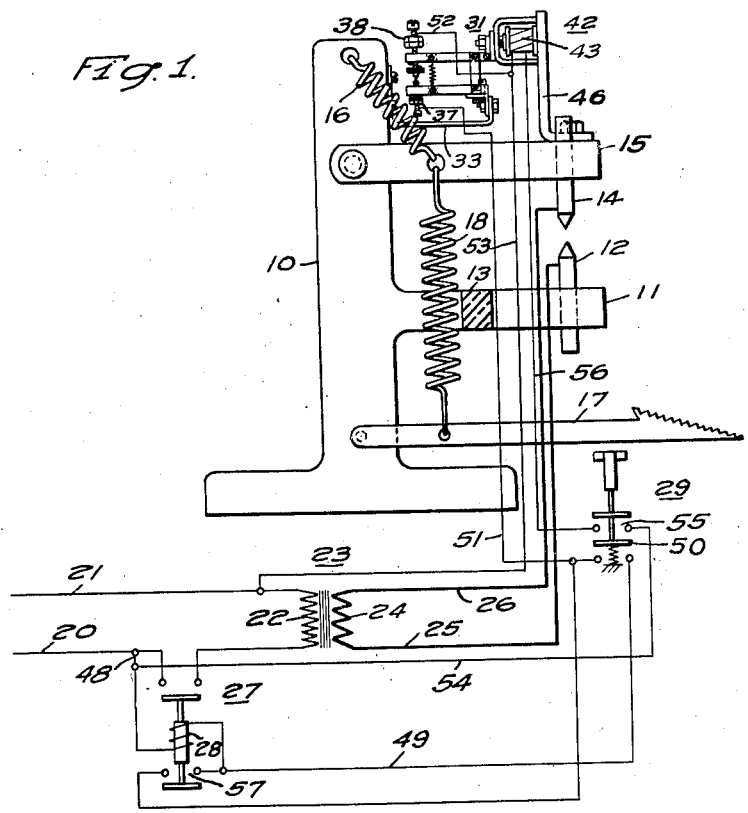

July 17, 1934.  R. B. LINCOLN  1,967,094

WELDING APPARATUS

Filed Jan. 14, 1933

WITNESSES:
E. A. McCloskey
R R Lockwood

INVENTOR
Rollo B. Lincoln.
J. W. Crawford
ATTORNEY

Patented July 17, 1934

1,967,094

UNITED STATES PATENT OFFICE 1,967,094

WELDING APPARATUS

Rollo B. Lincoln, Wilkinsburg, Pa., assignor to Westinghouse Electric & Manufacturing Company, East Pittsburgh, Pa., a corporation of Pennsylvania Application January 14, 1933, Serial No. 651,705

7 Claims. (Cl. 219—4)

My invention relates, generally, to electric welding apparatus and it has particular relation to resistance welding apparatus.

In the past, in resistance welding, it has been found that satisfactory welding conditions are obtained if certain values of current are applied for certain definite periods of time. It has also been found that the application of a given value of current over a longer or shorter period than that which is proper results in a poor weld either due to burning of the parts being welded or the poor or entire lack of fusion between them.

Various systems have been proposed for controlling the time of application of the welding current used for performing the welding operation. According to some of the prior art systems, the quantity of power supplied for performing the welding operation is measured and, after a predetermined quantity has been supplied, the flow of welding current is stopped. Another system of the prior art involves the use of timing devices which are employed to permit the flow of welding current for a predetermined period and, after this period of time has elapsed, to effect the cutting off of further flow of welding current.

The prior art systems for controlling the flow of current for performing a resistance welding operation are generally open to the objection that they do not include, as a function of the welding current control, the variable characteristics of the part of the work on which the welding operation is being performed. Alternatively, the prior art systems are based upon the successive forming of welds on work under conditions which are assumed to be identical. Thus, in certain instances the application of a predetermined quantity of power or of welding current for a predetermined period of time may result in a burned weld, if the resistance of the parts being welded is too low, or in a weld having little or no fusion, if the resistance of the weld is too high. It is also apparent to those skilled in the art that there are other disadvantages to the prior art systems for controlling the current supplied for performing resistance welding operations and that it is desirable to control the current in accordance with the characteristics of the weld itself.

The object of my invention, generally stated, is the provision of resistance welding apparatus that shall be simple, efficient and accurate in operation and readily and economically manufactured and installed.

A more specific object of my invention is to provide for controlling the application of current supplied for performing a resistance welding operation in accordance with a variable characteristic of the weld.

Another object of my invention is to provide for controlling the application of current supplied for performing a resistance welding operation in accordance with the distance which the welding electrodes penetrate the work being welded.

A further object of my invention is to provide for maintaining the application of welding current for performing a resistance welding operation independently of the means initiating it until the flow of current is automatically interrupted.

Other objects of my invention will, in part, be obvious and, in part, appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

Figure 2:
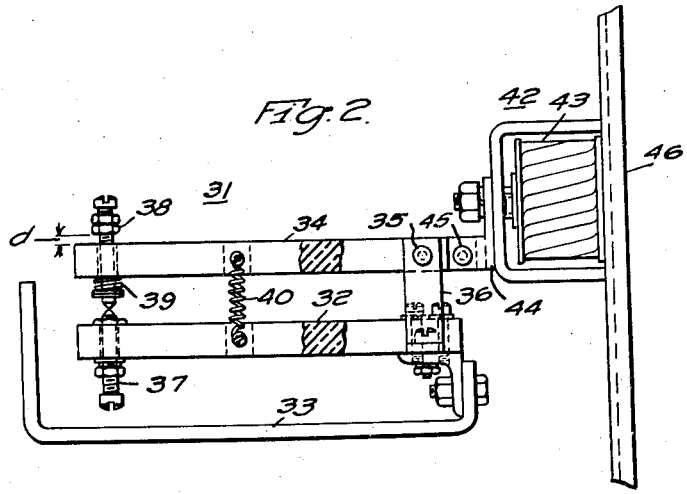

For a more complete understanding of the nature and scope of my invention, reference may be had to the following detailed description taken in connection with the accompanying drawing, in which;

Figure 1 is a diagrammatic view of a resistance welder constructed in accordance with this invention; and Fig. 2 is an enlarged view, in side elevation, of the control relay illustrated in Fig. 1.

Referring now to the drawing, the reference character 10 designates a frame which may be used for a resistance welding device. A support arm 11, extending horizontally from the frame 10, is provided for carrying a fixed electrode 12. An insulation section 13 is provided in the support arm 11, in any suitable manner, in order to insulate the fixed electrode 12 from the frame 10, as will be readily understood.

A second or movable electrode 14 is oppositely disposed relative to the fixed electrode 12 and is carried by a support arm 15 which may be pivotally mounted on the frame 10 as shown. In order to normally space the electrodes 12 and 14 apart to permit the insertion of the work to be welded therebetween, spring 16 may be connected between the frame 10 and the support arm 15, in order to resiliently retain the support arm 15 in the position as shown in the drawing.

With a view to effecting the engagement of the fixed and movable electrodes 12 and 14 with the work that is positioned therebetween to be welded, an operating lever 17 is pivotally mounted on the frame 10 and is arranged, as illustrated, for manual operation by the foot of the operator. A second spring 18 is provided for connecting the operating lever 17 to the support arm 15 in order to transmit the force exerted by the foot of the operator on the operating lever 17 to the support arm 15 and the electrode 14 carried thereby.

Current for performing the welding operation may be provided from any suitable current source such as an alternating current source by means of conductors 20 and 21 which may be connected to the primary winding 22 of a transformer 23. The secondary winding 24 of the transformer 23 is connected by means of conductors 25 and 26 to the welding electrodes 12 and 14, respectively, in the usual manner.

In order to control the connection of the welding electrodes 12 and 14 and of the welding circuit including the transformer 23 and the conductors 25 and 26 of the current source, an electro-magnetic main switch 27 having an operating winding 28 may be provided. The energization of the winding 28 is controlled by means of a control switch 29 which may be actuated by means of the operating lever 17 to complete a circuit for connecting the winding 28 to the energized conductors 20 and 21. It will be apparent that the position of the control switch 29 may be so arranged as to permit the engagement of the electrodes 12 and 14 with the work before the control switch 29 is actuated and, therefore, before the welding potential is applied to the electrodes 12 and 14. It is desirable to provide this arrangement of the control switch 29 in order to reduce the arcing at the terminals of the electrodes 12 and 14 to a minimum.

As set forth hereinbefore, it is preferable to control the application of the welding current in accordance with a variable characteristic of the weld and for this purpose a control relay 31 is provided. The control relay 31 is arranged to function in accordance with the depth of penetration of the welding electrode 14 in the work being welded as will be presently described.

The control relay 31 comprises a lower contact support member 32 of insulation material which may be mounted on the frame 10 by means of a bracket 33. An upper contact support member 34 is pivotally mounted at 35 on a suitable bracket 36 that is carried by the lower support member 32. Near the ends of the contact support members 32 and 34 contact members 37 and 38 are provided. As illustrated, the contact member 37 comprises a screw which is secured immovably to the support member 22 while the contact member 38 comprises a screw which is slidably mounted on the support member 34. A spring 39 is positioned between the upper side of the upper support member 34 and around the screw of the contact member 38 in order to bias the screw in a downward direction. The permissible range of movement of the screw is indicated by the distance "d". It will also be observed that a tension spring 40 is connected between the support members 32 and 34 for the purpose of urging them toward each other to maintain the contact members 37 and 38 in engagement.

The contact members 37 and 38 are connected in series circuit relation with the winding 28 of the main switch 27 over a circuit which will be traced hereinafter. In order to effect the opening of the contact members 37 and 38, an electro-magnet 42 is provided having an operating winding 43. The electro-magnet 42 is mounted on a suitable support bracket 44 which, in turn, is pivotally mounted at 45 on the support member 34. An armature 46, in the form of a strap, is secured to the upper side of the support arm 15 and is juxta-posed with the electro-magnet 42 so that, when the winding 43 is energized, the electro-magnet is held fast to the armature 46 and, as a result, any further movement of the electrode 14 is reflected in the movement of the upper support arm 34 which, if continued for a sufficient distance, will effect the separation of the contact members 37 and 38.

In operation, the work on which the welding operation is to be performed is positioned between the welding electrodes 12 and 14 and the operating lever 17 is depressed, thereby causing the work to be engaged by the electrodes. On further downward movement of the operating lever 17 the control switch 29 is actuated to complete a circuit for energizing the winding 28 of the main switch 27 and in addition to complete a circuit for energizing the winding 43 of the electro-magnet 42.

The circuit for energizing the winding 28 of the main switch 27 may be traced from the energized conductor 20 through conductor 48, winding 28 of the switch 27, conductor 49, contact members 50 of the control switch 29, conductor 51, contact members 37 and 38 of the control relay 31, and conductors 52 and 53 to the energized conductor 21.

The circuit for energizing winding 43 of the electro-magnet 42 may be traced from the energized conductor 20 through conductors 48 and 54, contact members 55 of the control switch 29, conductor 56, winding 43 and conductor 53 to the energized conductor 21.

The energization of winding 28 causes the main switch 27 to be actuated to the closed position for completing the connection between the welding circuit and the current source to permit current to flow to the electrodes 12 and 14 for performing the welding operation. Simultaneously, the energization of the winding 43 causes the electromagnet 42 to be attracted to the armature 46 with the result that further movement of the armature 46 or of the welding electrode 14 is transmitted to the upper contact support arm 34.

The continued application of pressure to the operating lever 17 urges the electrodes 12 and 14 toward each other while the continued application of welding current causes the work being welded to become somewhat plastic thereby permitting the electrodes 12 and 14 to penetrate the work. It has been found that the amount of penetration of the work being welded is a function of the condition of the weld and that it serves as an accurate indication of the instant at which the application of welding current should cease. Therefore, after the movable electrode 14 has moved downwardly a distance which may be proportional to the distance "d" or the limit of free movement of the contact member 38, the contact members 37 and 38 are separated and, as a result, the winding 28 is de-energized and the main switch 27 is opened. The further flow of welding current is then arrested and the operating lever 17 may be released. The operation may then be repeated to form additional welds as may be desired.

It will be observed that the distance "d" or the permissible range of free movement of the contact member 38 may be adjusted by means of the nuts there provided to permit any desired penetration of the work being welded before the contact members 37 and 38 are opened.

While it will be readily understood that the penetration of the work being welded by the electrodes 12 and 14 will be relatively slight, it will be noted that this movement is multiplied to any desired extent by providing a relatively short distance between the pivot points 35 and 45 and a relatively long distance between the pivot point 35 and the contact members 37 and 38.

In order to prevent the de-energization of the winding 28 and hence the opening of the main switch 27 before the welding operation is completed as controlled by the relay 31, auxiliary contact members 57 are provided on the main switch 27 which are closed when the switch 27 is actuated to the closed position. The contact members 57 are connected, over an obvious circuit, to bridge the contact members 50 of the control switch 29 and thereby prevent the de-energization of the winding 28 except as it is further controlled by the control relay 31.

It will be readily apparent to those skilled in the art that the control relay 31 may be constructed in a wide variety of forms and that it may be applied to a resistance welding machine and connected in the welding and control circuits thereof in other ways than are disclosed in this specification. Therefore, since further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. Resistance welding apparatus comprising in combination, fixed and movable spaced welding electrodes mounted on a frame, operating means connected to the movable electrode for effecting its engagement with work positioned between the two electrodes, a welding circuit connected to the electrodes, a main switch for connecting the welding circuit to a current source and a winding therefor, means for effecting the energization of the winding to operate the main switch, a relay provided with contact members connected in series circuit relation with the winding of the main switch, means for initiating the operation of said relay in accordance with the movement of said movable electrode, and means for effecting the operation of the relay to open said series circuit after the movable electrode has penetrated the work for a predetermined distance.

2. Resistance welding apparatus comprising, in combination, a frame, a fixed welding electrode carried by the frame, a movable electrode support arm pivotally mounted on the frame, an electrode carried by the movable support arm, operating means connected to the movable support arm for moving the electrode carried thereby into engagement with work disposed between the electrodes, a welding circuit connected to the electrodes, a main switch for connecting the welding circuit to a current source, an operating coil for the main switch, a control switch actuated by the operating means for effecting the energization of the operating coil after the welding electrodes engage the work, a fixed contact arm carried by the frame, a movable contact arm pivotally mounted on the fixed contact arm, adjustable contact members carried by the contact arms and connected in series circuit relation with the operating coil of the main switch, resilient means for biasing the contact members into mutual engagement, an electro-magnet carried by the movable contact arm, an armature carried by the movable electrode support arm and juxtaposed with the electro-magnet, and circuit means connecting the electro-magnet to the control switch to effect the energization of the electro-magnet after the welding electrodes engage the work thereby causing the contacts carried by the contact arms to separate after the movable electrode penetrates the work for a predetermined distance and effect the de-energization of the operating winding of the main switch to interrupt the flow of welding current to the welding electrodes.

3. Resistance welding apparatus comprising, in combination, a frame, a fixed welding electrode carried by the frame, a movable electrode support arm pivotally mounted on the frame, an electrode carried by the support arm, operating means connected to the movable support arm for moving the electrode carried thereby into engagement with work disposed between the electrodes, a welding circuit connected to the electrodes, a main switch for connecting the welding circuit to a current source, an operating coil for the main switch, a control switch actuated by the operating means for effecting the energization of the operating coil after the welding electrodes engage the work, auxiliary control members carried by the main switch and connected to effect a holding circuit for the winding of the main switch, a fixed contact arm carried by the frame, a movable contact arm pivotally mounted on the fixed contact arm, adjustable contact members carried by the contact arms and connected in series circuit relation with the operating coil of the main switch, resilient means for biasing the contact members into mutual engagement, an electro-magnet carried by the movable contact arm, an armature carried by the movable electrode support arm and juxta-posed with the electro-magnet, and circuit means connecting the electro-magnet to the control switch to effect the energization of the electro-magnet after the welding electrodes engage the work thereby causing the contacts carried by the contact arms to separate after the movable electrode penetrates the work for a predetermined distance and effect the deenergization of the operating winding of the main switch to interrupt the flow of welding current to the welding electrodes.

4. Resistance welding apparatus comprising, in combination, fixed and movable welding electrodes oppositely disposed for performing a welding operation on work positioned therebetween, operating means connected to the movable electrode for effecting the engagement of the electrodes with the work under pressure, a welding circuit connected to the electrodes, a main switch for connecting the welding circuit to a current source, an operating winding for the main switch, a control switch disposed in operative relation to the operating means for effecting the energization of the winding of the main switch to connect the welding circuit to the current source after the electrodes engage the work, a pair of adjustable contact members included in the relay and connected in series circuit relation with the winding of the main switch, a support member individual to each of the contact members, one of the contact members of the relay being slidably mounted to permit relative movement of the support means without separating the contact members, an electro-magnet mounted for movement with one of the support members, an armature carried by the movable electrode and disposed in operative relation with the electro-magnet, circuit means including the control switch connected to the electro-magnet for effecting its energization after the electrodes engage the work to move one of the contact support members in accordance with the further movement of the movable electrode and thereby separate the contact members to de-energize the winding of the main switch after the electrode has penetrated the work for a predetermined distance.

5. Resistance welding apparatus comprising, in combination, fixed and movable welding electrodes oppositely disposed for performing a welding operation on work positioned therebetween, operating means connected to the movable electrode for effecting the engagement of the electrodes with the work under pressure, a welding circuit connected to the electrodes, a main switch for connecting the welding circuit to a current source, an operating winding for the main switch, a control switch disposed in operative relation to the operating means for effecting the energization of the winding of the main switch to connect the welding circuit to the current source after the electrodes engage the work, contact means operable on the closure of the main switch and connected to maintain the winding thereof energized independently of the operation of the control switch, a relay, a pair of adjustable contact members included in the relay and connected in series circuit relation with the winding of the main switch, a support member individual to each of the contact members, one of the contact members of the relay being slidably mounted to permit relative movement of the support means without separating the contact members, an electro-magnet mounted for movement with one of the support members, an armature carried by the movable electrode and disposed in operative relation with the electro-magnet, circuit means including the control switch connected to the electro-magnet for effecting its energization after the electrodes engage the work to move one of the contact support members in accordance with the further movement of the movable electrode and thereby separate the contact members to de-energize the winding of the main switch after the electrode has penetrated the work for a predetermined distance.

6. Resistance welding apparatus comprising in combination, fixed and movable spaced welding electrodes mounted on a frame, operating means connected to the movable electrode for effecting its engagement with work positioned between the electrodes, a welding circuit connected to the electrodes, a main switch for connecting the welding circuit to a current source and a winding therefor, switch means operable in accordance with the movement of said operating means for effecting the energization of said winding after the work is engaged, a relay provided with normally closed contact members connected in series circuit relation with said winding, and electro-magnetic means connected to be energized on closure of said switch means for initiating the operation of said relay, the contact members of said relay being opened after the movable electrode has penetrated the work for a predetermined distance thereby effecting the deenergization of said winding and opening the welding circuit.

7. Resistance welding apparatus comprising, in combination, fixed and movable spaced welding electrodes mounted on a frame, operating means connected to the movable electrode for effecting its engagement with work positioned between the electrodes, a welding circuit connected to the electrodes, a main switch for connecting the welding circuit to a current source and a winding therefor, switch means operable in accordance with the movement of said operating means for effecting the energization of said winding after the work is engaged, auxiliary switch means disposed to be closed on energization of said winding and connected to maintain said winding energized on opening of said switch means, a relay provided with normally closed contact members connected in series circuit relation with said winding, with said auxiliary switch means, and with said switch means, and electro-magnetic means connected to be energized on closure of said switch means for initiating the operation of said relay, the contact members of said relay being opened after the movable electrode has penetrated the work for a predetermined distance thereby effecting the deenergization of said winding and opening the welding circuit.

ROLLO B. LINCOLN.